(12) United States Patent
Jansen

(10) Patent No.: US 9,104,460 B2
(45) Date of Patent: Aug. 11, 2015

(54) INTER-CLOUD LIVE MIGRATION OF VIRTUALIZATION SYSTEMS

(75) Inventor: Gerardus T. Jansen, Pedara (IT)

(73) Assignee: Red Hat, Inc., Raleigh, NC (US)

( * ) Notice: Subject to any disclaimer, the term of this patent is extended or adjusted under 35 U.S.C. 154(b) by 674 days.

(21) Appl. No.: 13/149,220

(22) Filed: May 31, 2011

(65) Prior Publication Data
US 2012/0311568 A1    Dec. 6, 2012

(51) Int. Cl.
G06F 9/455    (2006.01)
G06F 15/173   (2006.01)

(52) U.S. Cl.
CPC .... *G06F 9/45558* (2013.01); *G06F 2009/4557* (2013.01)

(58) Field of Classification Search
USPC ......................................................... 709/226
See application file for complete search history.

(56) References Cited

U.S. PATENT DOCUMENTS

| | | | |
|---|---|---|---|
| 2008/0222375 A1* | 9/2008 | Kotsovinos et al. | 711/162 |
| 2010/0131636 A1* | 5/2010 | Suri et al. | 709/224 |
| 2010/0250718 A1* | 9/2010 | Igarashi et al. | 709/221 |
| 2010/0287548 A1* | 11/2010 | Zhou et al. | 718/1 |
| 2010/0322255 A1* | 12/2010 | Hao et al. | 370/398 |
| 2011/0019676 A1* | 1/2011 | Portolani et al. | 370/395.53 |
| 2011/0246669 A1* | 10/2011 | Kanada et al. | 709/238 |
| 2011/0274108 A1* | 11/2011 | Fan | 370/390 |
| 2012/0110181 A1* | 5/2012 | Tsirkin | 709/226 |
| 2012/0216194 A1* | 8/2012 | Hadas et al. | 718/1 |

FOREIGN PATENT DOCUMENTS

EP    2562973 A1 *   2/2013

OTHER PUBLICATIONS

Unknown Author, "What is a Port", whatismyipaddress.com/port, Jan. 13, 2011.*

* cited by examiner

*Primary Examiner* — Lewis A Bullock, Jr.
*Assistant Examiner* — Kevin X Lu
(74) *Attorney, Agent, or Firm* — Lowenstein Sandler LLP

(57) ABSTRACT

A mechanism for inter-cloud live migration of virtualization systems is disclosed. A method of the invention includes receiving notification that live migration of a virtual machine (VM) has completed, wherein the VM is migrated from a source host computing machine on a source cloud to a target host computing machine on a target cloud, receiving requests sent to a previous IP address of the VM associated with the source cloud, the requests routed over a layer-2 (L2) network tunnel established between the source cloud and the target cloud, configuring a new network interface with a new Internet Protocol (IP) address for the VM to receive requests directly via a communication connection of the target cloud, and simultaneously handling the requests at both of the previous IP address received via the L2 network tunnel and the new IP address via the communication connection of the target cloud.

17 Claims, 5 Drawing Sheets

300

```
Receive notification of completion of live migration of state of a VM, where the VM
is migrating from a host machine on a source cloud to a host machine on a target
cloud
                                                                              310
```

```
Continue to receive communications using the previous IP and MAC address
from the source cloud, the communications received via a L2 network tunnel
established between the source and target clouds
                                                                              320
```

```
Configure new network interface for the VM
                                                                              330
```

```
Establish new IP address for the VM network interface
                                                                              340
```

```
Create new default gateway for VM
                                                                              350
```

```
Initiate update to name resolution service so that client applications can find
migrated VM using new IP address
                                                                              360
```

```
Simultaneously handle requests from both the old (via the L2 tunnel) and the new
(via direct internet uplink at target cloud) IP addresses at the VM
                                                                              370
```

```
Discontinue receipt of communications at the VM via the old IP address upon
tear-down of the L2 network tunnel due to satisfaction of policies determined by a
cloud controller managing the target cloud host machine that provides the VM
                                                                              380
```

```
Initiate live migration process for a VM between host machines on a source cloud
and a target cloud
                                                                              410
                                    │
                                    ▼
Establish L2 network tunnel between the source and target clouds
                                                                              420
                                    │
                                    ▼
Instruct hypervisor of source cloud host machine to begin state transfer of the VM
to the target cloud host machine
                                                                              430
                                    │
                                    ▼
Notify VM agent of completion of state transfer of VM
                                                                              440
                                    │
                                    ▼
Monitor L2 tunnel for communications to the VM via the old source cloud
communication connection
                                                                              450
                                    │
                                    ▼
If after a predetermined time interval a policy requirements are met regarding the
amount of old connections using the L2 tunnel, then tear down the L2 tunnel
                                                                              460
```

*Fig. 4*

INTER-CLOUD LIVE MIGRATION OF VIRTUALIZATION SYSTEMS

TECHNICAL FIELD

The embodiments of the invention relate generally to virtualization systems and, more specifically, relate to a mechanism for inter-cloud live migration of virtualization systems.

BACKGROUND

Cloud computing is the provision of dynamically scalable and often virtualized resources as a service over the Internet on a utility basis. Users do not have to have any knowledge of, expertise in, or control over the technology infrastructure in the "cloud" that supports them. People only pay for what they need, and can increase and decrease usage at any minute. Cloud computing services often provide common business applications online that are accessed from a web browser, while the software and data are stored on the servers.

Cloud computing customers do not generally own the physical infrastructure serving as host to the software platform in question. They typically consume resources as a service and pay only for resources that they use. The majority of cloud computing infrastructures consist of reliable services delivered through data centers and built on servers with different levels of virtualization technologies. The services are accessible anywhere that provides access to networking infrastructure. Clouds often appear as single points of access for all consumers' computing needs.

The rise of the virtualization environment has provided for the advent of virtual machines (VMs). In computer science, a VM is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs. Virtualization systems provide a potential means to access computing resources in a confidential and anonymous way. VMs are an ideal infrastructure to provide computing resources in cloud computing and are currently utilized in this way.

Cloud computing cannot be complete without a way to move VM workloads from one cloud to the other. This capability should be quick, reliable, and transparent to the end users of the VM that is hosted in a cloud. Without such capabilities, people will be locked into a particular cloud, and there will not be any "spill over" capabilities.

One current solution to provide inter-cloud VM workload migration is to re-architect applications to support inter-cloud migration from the beginning. An example of such architecture is a three-tier web architecture with local replicated databases that are mostly read-only. Another example is that of batch workloads. The disadvantage of a re-architecture is that it is very costly, and not all workloads can be naturally re-architected.

Another solution for inter-cloud VM workload migration is to set up permanent network tunnels between clouds so that any resources in the cloud that is the target for a migration appear local to the source cloud. In some instances, this can also be combined with live migration of compute and disk resources. The disadvantage here is that the network tunnels are permanent. This incurs a performance hit, a cost, and only works naturally if there's a definite "source" for the workload. When thinking of a world-wide infrastructure in which workloads can be started anywhere and moved anywhere, and where any internal cloud, if it exists, is a peer amongst equals, such a scheme is not ideal.

BRIEF DESCRIPTION OF THE DRAWINGS

Embodiments of the invention will be understood more fully from the detailed description given below and from the accompanying drawings of various embodiments of the invention. The drawings, however, should not be taken to limit the invention to the specific embodiments, but are for explanation and understanding only.

FIG. 3 is a flow diagram illustrating a method performed by a virtual machine for inter-cloud live migration of virtualization systems according to an embodiment of the invention;

FIG. 4 is a flow diagram illustrating a method performed by a cloud controller for inter-cloud live migration of virtualization systems according to an embodiment of the invention.

DETAILED DESCRIPTION

Figure 1:
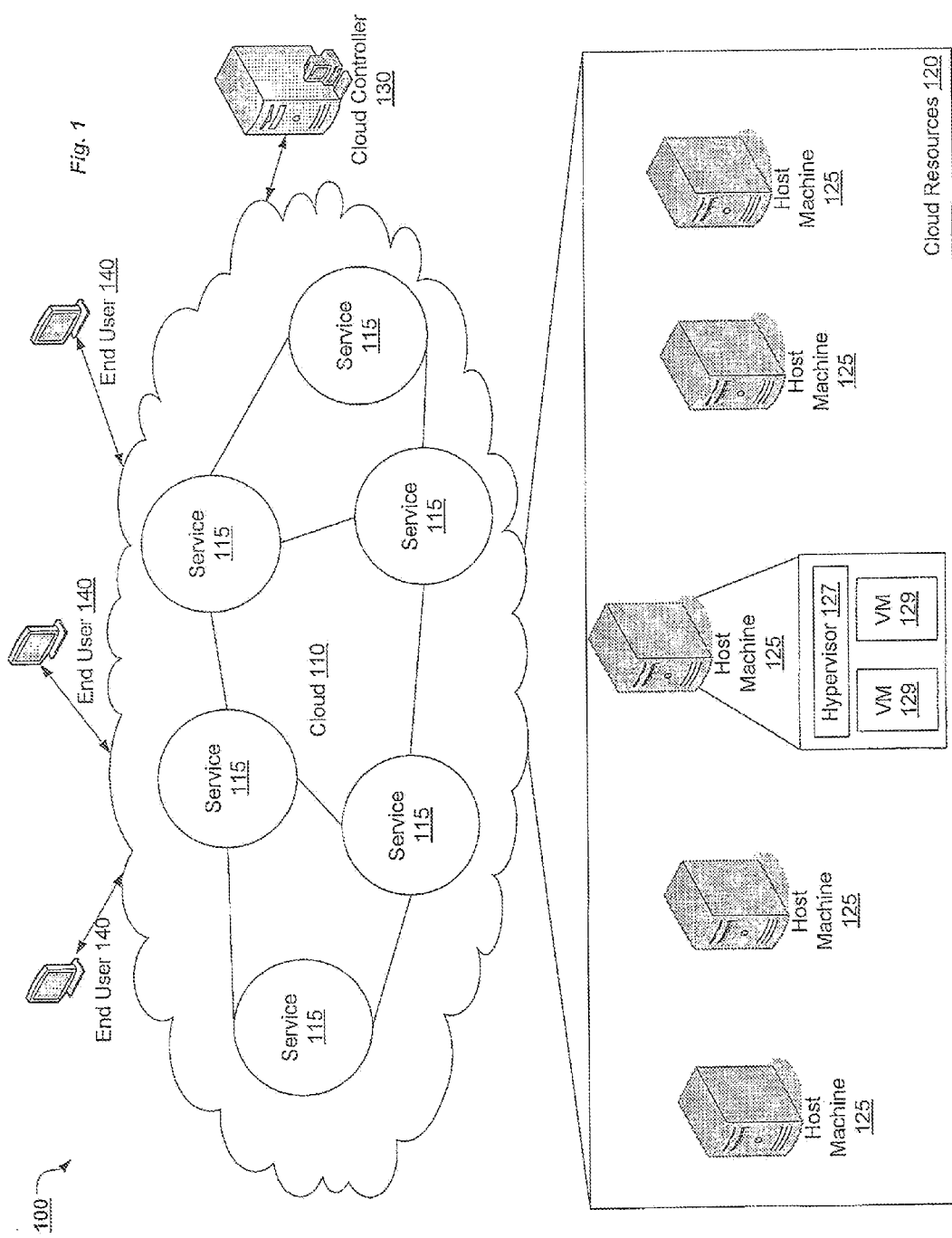
FIG. 1 is a block diagram of an exemplary cloud computing architecture in which embodiments of the present invention may operate.

Embodiments of the invention provide a mechanism for inter-cloud live migration of virtualization systems. A method of embodiments of the invention includes receiving notification that live migration of a virtual machine (VM) has completed, wherein the VM is migrated from a source host computing machine on a source cloud to a target host computing machine on a target cloud, receiving requests sent to a previous IP address of the VM associated with the source cloud, the requests routed over a layer-2 (L2) network tunnel established between the source cloud and the target cloud, configuring a new network interface with a new Internet Protocol (IP) address for the VM to receive requests directly via a communication connection of the target cloud, and simultaneously handling the requests at both of the previous IP address received via the L2 network tunnel and the new IP address via the communication connection of the target cloud.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "configuring", "handling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including optical disks, CD-ROMs, and magnetic-optical disks, read-only memories (ROMs), random access memories (RAMS), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for inter-cloud live migration of virtualization systems. As part of the live migration of VM workloads between clouds, embodiments of the invention free the VM from their networking dependence on their physical location. For example, the live migration process for a VM between two different cloud locations begins with constructing a layer-2 tunnel between the source and target LANs to which the hypervisors are connected. Once live migration is complete, an agent inside the target VM configures a new network interface with a new IP address. A new default gateway is created, while current connections continue to use the old default gateway. The VM agent initiates the update that will result in the client finding the server under the new IP address (e.g., via dynamic DNS update). If, after a specified period of time, no new connections are set up on the L2 tunnel and all existing connections are closed on that tunnel, then the tunnel is torn down and the inter-cloud migration process is complete.

FIG. 1 illustrates an exemplary cloud computing architecture 100 in which embodiments of the present invention may operate. The cloud computing architecture 100 may include a cloud 110 comprising dynamically scalable and virtualized resources used to provide services 115 over the Internet. One or more end users 140 may access and utilize the services 115 via client devices without having to maintain dedicated hardware on their end. In one embodiment, a cloud controller 130 is provided to manage the resources and services of the cloud 110. In some embodiments, the host controller 105 may reside on a designated computer system (e.g., a server computer, a desktop computer, etc.) or be part of a host machine 110 or another machine.

As illustrated, a break-out box of the cloud 110 shows the actual cloud resources 120 including hardware that may be utilized by embodiments of the invention as computing resources of the cloud 110. Embodiments of the invention may utilize one or more host machines 125 to execute a plurality of virtual machines (VMs) 129 that may be used as cloud computing resources. In embodiments of the invention, each host machine 125 is capable of running one or more virtual machines (VMs) 129. Each VM 129 runs a guest operating system (OS) that may be different from one another. The guest OS may include Microsoft Windows, Linux, Solaris, Mac OSX, etc. The host machine 125 may include a hypervisor 127 that emulates the underlying hardware platform for the VMs 129. The hypervisor 127 may also be known as a virtual machine monitor (VMM), a kernel-based hypervisor or a host operating system. In one embodiment, each VM 129 may be accessed by one or more of clients over a network (not shown). The network may be a private network (e.g., a local area network (LAN), wide area network (WAN), intranet, etc.) or a public network (e.g., the Internet).

To optimize productivity of the cloud 1110, workloads of the VMs 129 should be transferable from one cloud to another. This workload migration capability should be quick, reliable, and transparent to the end users 140 of the VM 129 that is hosted in a cloud. Embodiments of the invention provide a way to live migrate a VM 129 between different clouds without downtime. In one embodiment, a cloud controller 130 may oversee the migration of VMs 129 from the cloud 110.

Figure 2:
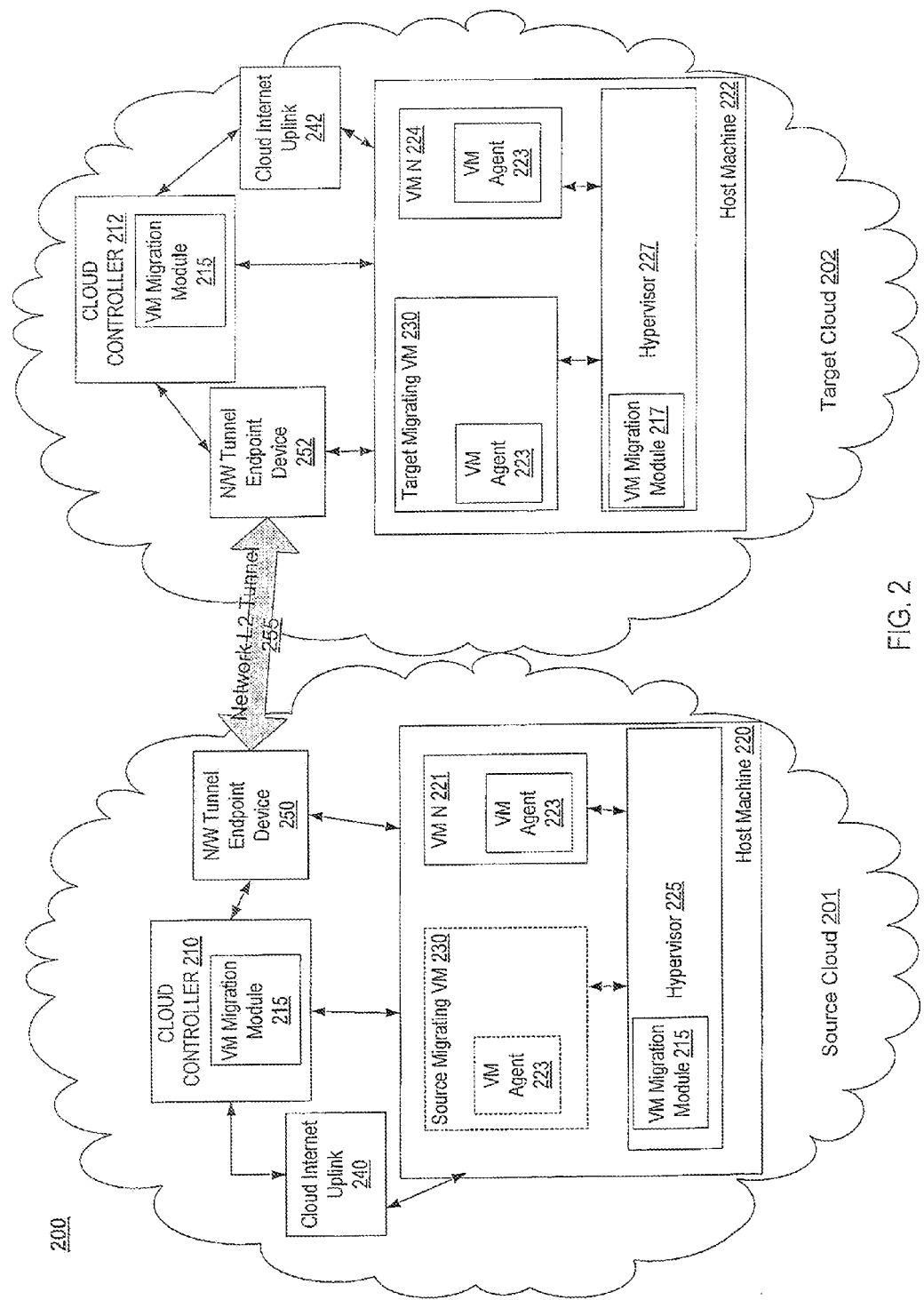
FIG. 2 is a block diagram of an exemplary multiple-cloud computing architecture which VMs may live migration between according to embodiments of the invention.

FIG. 2 illustrates an exemplary multiple-cloud computing architecture 200 which VMs may live migrate between according to embodiments of the invention. Multiple-cloud computing architecture 200 includes a source cloud 201 and a target cloud 202. Both clouds 201, 202 may be private or public, internal or external. Each cloud is managed by a cloud controller 210, 212. In one embodiment, clouds 201, 202 are the same as cloud 110 described with respect to FIG. 1.

In one embodiment, the cloud controller 210, 212 is part of an enterprise virtualization solution, such as Red Hat Enterprise Virtualization. Furthermore, clouds 201, 202 include one or more host machines 220, 222, each including a hypervisor 225, 227 configured to virtualize the resources of the host machine 220, 222 for the execution of one or more VMs 221, 224, 230. In one embodiment, host machines 220, 222 are the same as host machine 125, hypervisors 225, 227 are the same as hypervisor 127, and VMs 221, 224, 230 are the same as VMs 129 described with respect to FIG. 1.

Embodiments of the invention live migrate a workload of a VM 230 from the source 201 to the target 202 cloud. For purposes of explanation, the following description assumes that a single VM workload is being migrated and that clients access the services of that server via the public Internet. However, embodiments of the invention may be extended to multi-VM workloads, and to clients on private intranets.

The live migration process of embodiments of the invention begins with the initiation of the live migration process by a VM migration module 215 of the cloud controller 210, 212. The VM migration module 215 may operate on the source cloud controller 210, the target cloud controller 212, or some combination of the two. For purposes of explanation, assume that VM migration module 215 manages the migration of VM 230 from host machine 220 of source cloud 201 to host machine 222 of target cloud 202. As part of the live migration process, VM migration module 215 sets up a layer-2 (L2) network tunnel 255 between the source and the target clouds' network tunnel endpoint devices 250, 252.

To set up a L2 network tunnel, the target could 202 would listen on the network for requests by the source cloud 201 to setup a tunnel. Once they connect, and all necessary parameters are transferred, each side configures the tunnel end point on their own side and the tunnel is created. Each tunnel end point has two sides, an external side on which packages are exchanged with the other cloud, and an internal side connected to the LAN on which the hypervisors 225 are present. The source and target hypervisors 225 of the migrating VM 230 are each connected via the LAN to the respective network tunnel endpoint devices 250, 252. The L2 tunnel 255 allows the VM 230 to be communicably reachable under its MAC address (which did not change with migration) and previous IP address (which did change with embodiments of the invention) associated with the source cloud 201 after the VM 230 is migrated over to the target cloud 202.

L2 is a term in the OSI model and refers to the data link layer. This is the layer directly above the physical layer and is responsible for transmitting packets between computers that are connected to the same LAN. A well known example of an L2 protocol is Ethernet. Higher level protocols, like IP and TCP exist in higher levels (3 and 4 respectively). By tunneling on the L2 level, you basically "merge" the two sides that are connected via the tunnel and make it look like they are on the same physical LAN. Because Live Migration only works on the LAN (more accurately: inside an "L2 domain"), it is absolutely required that the tunnel is at the L2 level and not at a higher level.

Then, the actual live migration of the state of the VM 230 is started from the source 201 to the target 202 cloud. This is an iterative process performed by the hypervisor 225 of the source cloud host machine 220. Changed memory and disk blocks are copied over to the target cloud host machine 222 in successive scans until no more progress can be made. After the live migration of the VM 230 state is complete and the VM 230 is running at the target cloud 202, all network traffic for the VM 230 will continue to be routed through the cloud internet uplink 240 of the source cloud 201 via the L2 network tunnel 255. The cloud internet uplink 240 is the network connection that connects the clouds 201 network to the Internet. Internet uplinks come in various forms. For example, an internet uplink may include an ADSL, a cable model, a MPSL, and a dedicated fiber optic cable connected to one or more major Internet Exchanges, to name a few examples.

At this point, a VM agent 223 running inside the VM 230 is notified of the completed migration by the VM migration module 215 via L2 network tunnel 255. In response, the VM agent 223 sets up a new communication connection for the migrated VM 230 on the target cloud 202. This new communication connection may directly utilize the cloud internet uplink 242 connection of the target cloud 202, instead of the VM 230 having to route communications via the old communication connection from the source cloud 201.

The new communication connection is established by first configuring a new network interface, with a new IP address established for the interface. In one embodiment, the new IP address may be established via Dynamic Host Configuration Protocol (DHCP). In other embodiments, the new IP address may be provided by the target cloud 202 via the VM agent 223. In one embodiment, the VM agent 223 gets its instructions via a special back channel (often referred to as "VM channel") directly from the hypervisor 225, 227. It cannot use the network to get the instructions, because the VM does not yet have an IP address in the target cloud. Note that it is not the VM agent 223 that listens on the wildcard IP address, or services requests to clients. It is the application that is providing the service 115, and which runs inside the VM 230. The VM agent 223 and the application are both present inside the OS.

It is possible for a VM 230 to have multiple associated IP addresses in the following ways. First, a new virtual network card (made available to the VM 230 by the hypervisor 227) with a new IP address may be added to the VM 230, that shows up as a second interface in the VM OS. Second, a new interface for the same virtual network card in the VM may be created. These two interfaces would share a single virtual network card. This second network interface is sometimes called a "virtual interface." Lastly, a second IP address may be added to the same network interface on a same virtual network card.

As a default, the VM agent 223 should be configured to listen on the "wildcard" IP address. When an application listens on the wildcard IP address, it basically tells the OS to forward any traffic that arrives on a specific port, irrespective of the IP address that it was targeted for. This allows for the insertion of a new IP address on the OS, and requests to that IP address are then automatically responded to by the application. This ensures the when the new network interface is defined and configured, the VM agent 223 can immediately service requests from it. In other embodiments, the application may be notified by the VM agent 223 to listen on the new IP address. Then, the VM agent 223 creates a new default gateway. As previously noted, all current connections of the migrated VM 230 continue to use the old default gateway from the source cloud 201. Advanced routing support from the OS of the migrated VM 230 will enable the current connections to continue to use the old default gateway. To finalize the creation of the new communication connection for the migrated VM 230, the VM agent 223 initiates a name resolution update that will ultimately result in clients of the migrated VM 230 finding the new host machine 222 hosting the VM 230 under the new IP address. In one embodiment, this is done via a dynamic Domain Name Service (DNS) update. However, other resolution mechanisms are supported by embodiments of the invention as well.

As a final step in the live migration process of embodiments of the invention, the VM migration module 215 continues to monitor the L2 tunnel 255. If, after a pre-determined time interval, no new connections are set up to the VM 230 via the new IP address and all existing connections via the L2 tunnel 255 are closed, then the L2 tunnel 255 may be torn down and the inter-cloud live migration process may be completed. Embodiments of the invention do not mandate an absolute cut-off time at which the VM 230 needs to be available at only the new network location. Instead, embodiments of the invention allow the old current connections to the VM 230 from the source cloud 201 to expire, and time for the service discovery mechanism to be updated for the new communication connections to the VM 230 at the target cloud 202. The policy to close the L2 network tunnel may be quite flexible. In one embodiment, the VM migration module 215 may decide to tear down the tunnel based on any of the following: after a pre-defined period of time has passed, when no more connection are present on the tunnel, a combination of the two prior options, or any other criteria that is relevant to the tunnel operations.

It is assumed that client applications will utilize a lookup mechanism to locate the address of the target VM 230. Most client applications use DNS to provide such lookups, and DNS has the right dynamic update capabilities to support embodiments of the invention. However, other lookup mechanisms are envisioned, for example, Oracle's TNSNAMES.ORA, which can be similarly updated.

FIG. 3 is a flow diagram illustrating a method 200 performed by a VM for inter-cloud live migration of virtualization systems according to an embodiment of the invention. Method 200 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by VM 129 of FIG. 1 and/or VM 230 of FIG. 2.

Method 300 begins at block 310 where notification is received of the completion of live migration of a state of a VM. The VM is migrated from a host machine on a source cloud to a host machine on a target cloud. In one embodiment, a VM agent on the migrated VM receives this notification. Then, at block 320, network communications to the VM from the MAC address and previous IP address associated with the source cloud host machine are continued to be received via an L2 network tunnel. The L2 network tunnel is established between the network tunnel endpoint devices found on each of the source and target clouds. At block 330, a new network interface is configured for the VM on the target cloud. In one embodiment, the VM agent is responsible for this configuration. As part of the new network interface, a new IP address and new default gateway are also created at blocks 340 and 350.

Subsequently, at block 360, an IP address update at a name resolution service is initiated in order for client applications to be able to locate the migrated VM at the new IP address. In one embodiment, the name resolution service is DNS. At block 370, requests from both of the old and new IP addresses are handled simultaneously by the VM. This means that requests are received from both of the L2 network tunnel and the new network interface for the VM at the same time. Lastly, at block 380, receipt of communications from the old IP address via the L2 network tunnel is discontinued upon tear down of the L2 network tunnel. In one embodiment, the L2 network tunnel is torn down upon satisfaction of policies established by a cloud controller of the target cloud that dictate the minimum number of percentage of old connections still existing before the L2 network tunnel may be removed.

FIG. 4 is a flow diagram illustrating a method 400 performed by a cloud controller for inter-cloud live migration of virtualization systems according to an embodiment of the invention. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by cloud controller 130 of FIG. 1 and/or cloud controller 210, 212.

Method 400 begins at block 410 where a live migration process for a VM is initiated between host machines on a source cloud and a target cloud. In one embodiment, a VM migration manager of a cloud controller initiates the live migration process. At block 420, a L2 network tunnel is established between the source and target clouds. In one embodiment, the tunnel is created between network tunnel endpoint devices associated with each cloud. The L2 network tunnel will continue to carry network traffic using the IP address of migrated VM from the source cloud to the actual location of the VM on the target cloud. Then, at block 430, a hypervisor of the source cloud host machine is instructed to begin transferring the state of the VM to the target cloud host machine as part of the live migration. At block 440, a VM agent on the migrated VM is notified of the completion of the VM state transfer.

Subsequently, at block 450, the L2 network tunnel is monitored for any communications to the VM via L2 network tunnel. Lastly, at block 460, the L2 network tunnel is torn down if policy requirements are met after a predetermined period of time. In one embodiment, the policy requirements dictate the minimum number of percentage of old connections still existing before the L2 network tunnel may be removed. In addition, the time interval may be administrator-specified.

Figure 5:
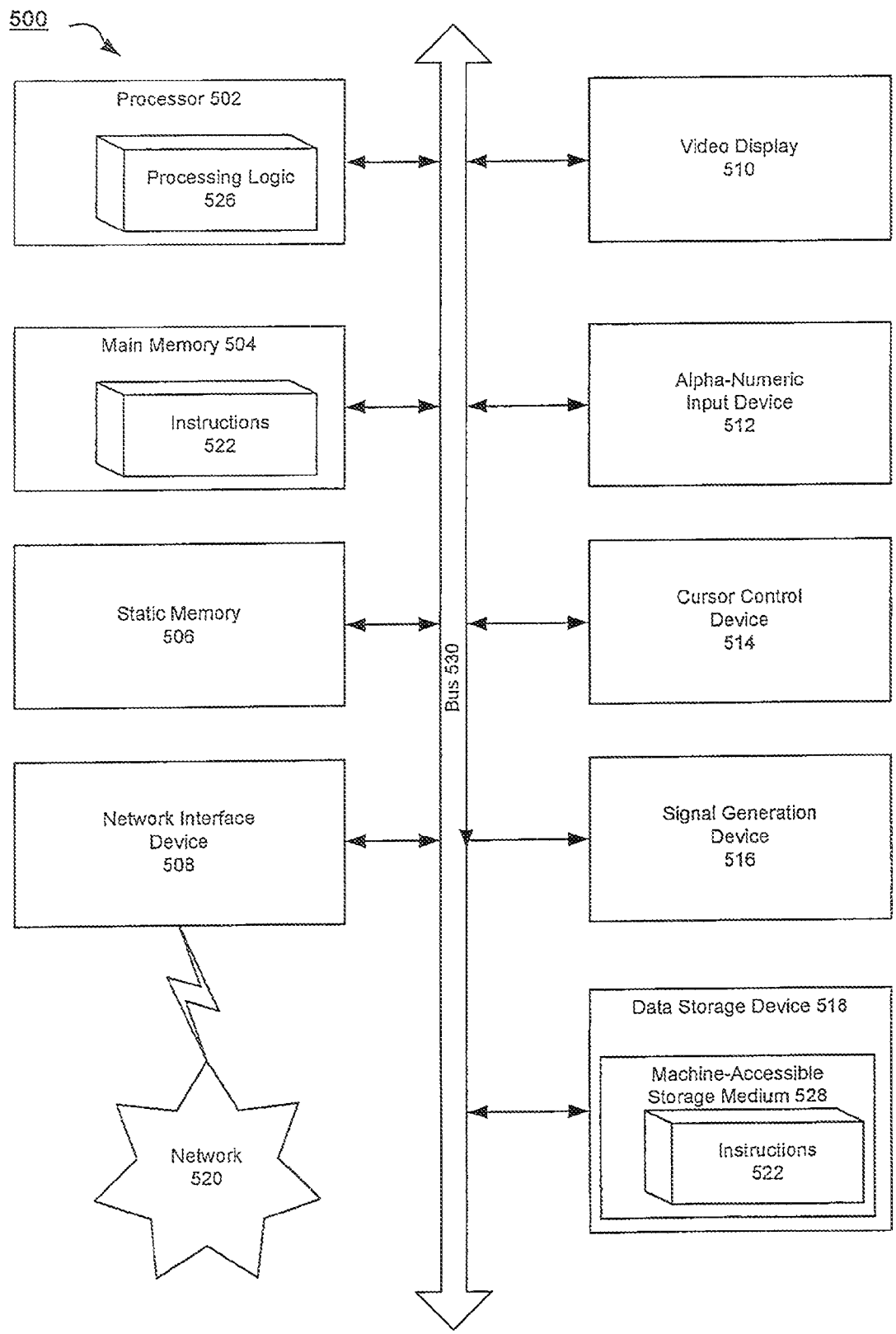
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. For example, software 522 may store instructions to perform inter-cloud live migration of virtualization systems by host machine 125 or cloud controller 130 described with respect to FIG. 1. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to store instructions to perform methods 300 and 400 for inter-cloud live migration of virtualization systems described with respect to FIGS. 3 and 4, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
   receiving, by a virtual machine (VM) migrated from a source host computing machine on a source cloud to a target host computing machine on a target cloud, notification that live migration of the VM has completed;
   receiving, by the VM, requests sent to a previous IP address of the VM corresponding to the source cloud, the requests routed to the VM via a layer-2 (L2) network tunnel established between the source cloud and the target cloud for the live migration of the VM;
   configuring, by the VM, a new network interface with a new Internet Protocol (IP) address for the VM to receive requests directly via a communication connection of the target cloud;
   handling, by the VM, the requests at both of the previous IP address received via the L2 network tunnel and the new IP address via the communication connection of the target cloud; and
   terminating the L2 network tunnel and requests are no longer received at the VM under the previous IP address when policy requirements are satisfied, the policy requirements comprising a determined time interval passing and less than a certain number of communication connections existing on the L2 network tunnel, and wherein the communications connections each comprise a data link established between another computing device and the VM using a media access control (MAC) address of the VM and the previous IP address of the VM.

2. The method of claim 1, wherein a VM agent of the VM is dedicated to receiving the notification, receiving the requests, configuring the new network interface, and simultaneously handling the requests.

3. The method of claim 1, wherein configuring the new network interface further comprises:
   establishing the new IP address for the VM;
   creating a new default gateway for the VM; and
   initiating an update to a name resolution service for the VM and its new associated IP address.

4. The method of claim 3, wherein the name resolution service is Domain Name Service (DNS).

5. The method of claim 3, wherein creating a new default gateway further comprises keeping a previous default gateway of the VM open to receive communications.

6. The method of claim 1, wherein the policy requirements further comprise a minimum percentage of existing connections existing on the L2 network tunnel.

7. The method of claim 1, wherein the VM is configured to listen on a wildcard IP address in order to receive the requests under the new IP address.

8. A non-transitory machine-readable storage medium including instructions that, when accessed by a processing device, cause the processing device to perform operations comprising:
   receiving, by the processing device, notification that live migration of a virtual machine (VM) has completed, wherein the VM is migrated from a source host computing machine on a source cloud to a target host computing machine comprising the processing device on a target cloud;
   receiving requests sent to a previous IP address of the VM corresponding to the source cloud, the requests routed to the VM via a layer-2 (L2) network tunnel established between the source cloud and the target cloud for the live migration of the VM;
   configuring a new network interface with a new Internet Protocol (IP) address for the VM to receive requests directly via a communication connection of the target cloud;
   handling the requests at both of the previous IP address received via the L2 network tunnel and the new IP address via the communication connection of the target cloud; and
   terminating the L2 network tunnel and requests are no longer received at the VM under the previous IP address when policy requirements are satisfied, the policy requirements comprising a determined time interval passing and less than a certain number of communication connections existing on the L2 network tunnel, and wherein the communications connections each comprise a data link established between another computing device and the VM using a media access control (MAC) address of the VM and the previous IP address of the VM.

9. The non-transitory machine-readable storage medium of claim 8, wherein a VM agent of the VM is dedicated to receiving the notification, receiving the requests, configuring the new network interface, and simultaneously handling the requests.

10. The non-transitory machine-readable storage medium of claim 8, wherein configuring the new network interface further comprises:
establishing the new IP address for the VM;
creating a new default gateway for the VM; and
initiating an update to a name resolution service for the VM and its new associated IP address.

11. The non-transitory machine-readable storage medium of claim 8, wherein the policy requirements further comprise a minimum percentage of existing connections existing on the L2 network tunnel.

12. A system, comprising:
a processing device;
a memory communicably coupled to the processing device; and
a virtual machine (VM) executable from the memory by the processing device to virtualize resources of the memory and the processing device, the VM migrated from a source host computing machine on a source cloud to the system comprising a target host computing machine on a target cloud, and the VM comprising a VM agent to:
receive notification that live migration of the VM has completed;
receive requests sent to a previous IP address of the VM corresponding to the source cloud, the requests routed to the VM via a layer-2 (L2) network tunnel established between the source cloud and the target cloud for the live migration of the VM;
configure a new network interface with a new Internet Protocol (IP) address for the VM to receive requests directly via a communication connection of the target cloud;
handle the requests at both of the previous IP address received via the L2 network tunnel and the new IP address via the communication connection of the target cloud at a same time; and
terminate the L2 network tunnel and requests are no longer received at the VM under the previous IP address when policy requirements are satisfied, the policy requirements comprising a determined time interval passing and less than a certain number of communication connections existing on the L2 network tunnel, and wherein the communications connections each comprise a data link established between another computing device and the VM using a media access control (MAC) address of the VM and the previous IP address of the VM.

13. The system of claim 12, wherein the VM agent to configure the new network interface further comprises the VM agent to:
establish the new IP address for the VM;
create a new default gateway for the VM; and
initiate an update to a name resolution service for the VM and its new associated IP address.

14. The system of claim 13 wherein the name resolution service is Domain Name Service (DNS).

15. The system of claim 13, wherein the VM agent to create a new default gateway further comprises the VM agent to keep a previous default gateway of the VM open to receive communications.

16. The system of claim 12, wherein the policy requirements further comprise a minimum percentage of existing connections existing on the L2 network tunnel.

17. The system of claim 12, wherein the VM is to listen on a wildcard IP address in order to receive the requests under the new IP address.

\* \* \* \* \*